United States Patent [19]
Yamada

[11] 3,947,110
[45] Mar. 30, 1976

[54] AUTOMATIC PHOTOGRAPH PRINTING CONTROL SYSTEM

[76] Inventor: Yoshihiro Yamada, No. 1685-223, Mukaiyama, Oaza Hirabari, Tenpakucho, Showa, Nagoya, Aichi, Japan

[22] Filed: July 12, 1974

[21] Appl. No.: 488,121

Related U.S. Application Data

[63] Continuation of Ser. No. 340,163, March 12, 1973, abandoned.

[30] Foreign Application Priority Data
Mar. 29, 1972   Japan.............................. 47-30664

[52] U.S. Cl..................................... 355/38; 355/88
[51] Int. Cl.².......................................... G03B 27/78
[58] Field of Search.............................. 355/38, 88

[56] References Cited
UNITED STATES PATENTS
| | | | |
|---|---|---|---|
| 3,519,347 | 7/1970 | Bowker | 355/88 |
| 3,694,074 | 9/1972 | Huboi | 355/38 |

Primary Examiner—Richard M. Sheer
Attorney, Agent, or Firm—Kane, Dalsimer, Kane, Sullivan and Kurucz

[57] ABSTRACT

The present invention relates to an automatic off-line photograph printing control system consisting of a reader and a printer. The system employs a magnetic or other similar recording means for storing correcting information of a negative film to be applied for automatically controlling printing works. Inspection and selection of each effective frame of the negative film at the stage of reading are usually performed through a projector (and a screen or through direct visual inspection of the negative film itself by the operator). Detection of effective frames of film at the stage of printing shall be carried out automatically with information marked on the negative film and information for adjustment of the exposure time supplied by the magnetic recording means upon printing. All the data concerning the negative film itself and others are processed in digital fashion.

3 Claims, 11 Drawing Figures

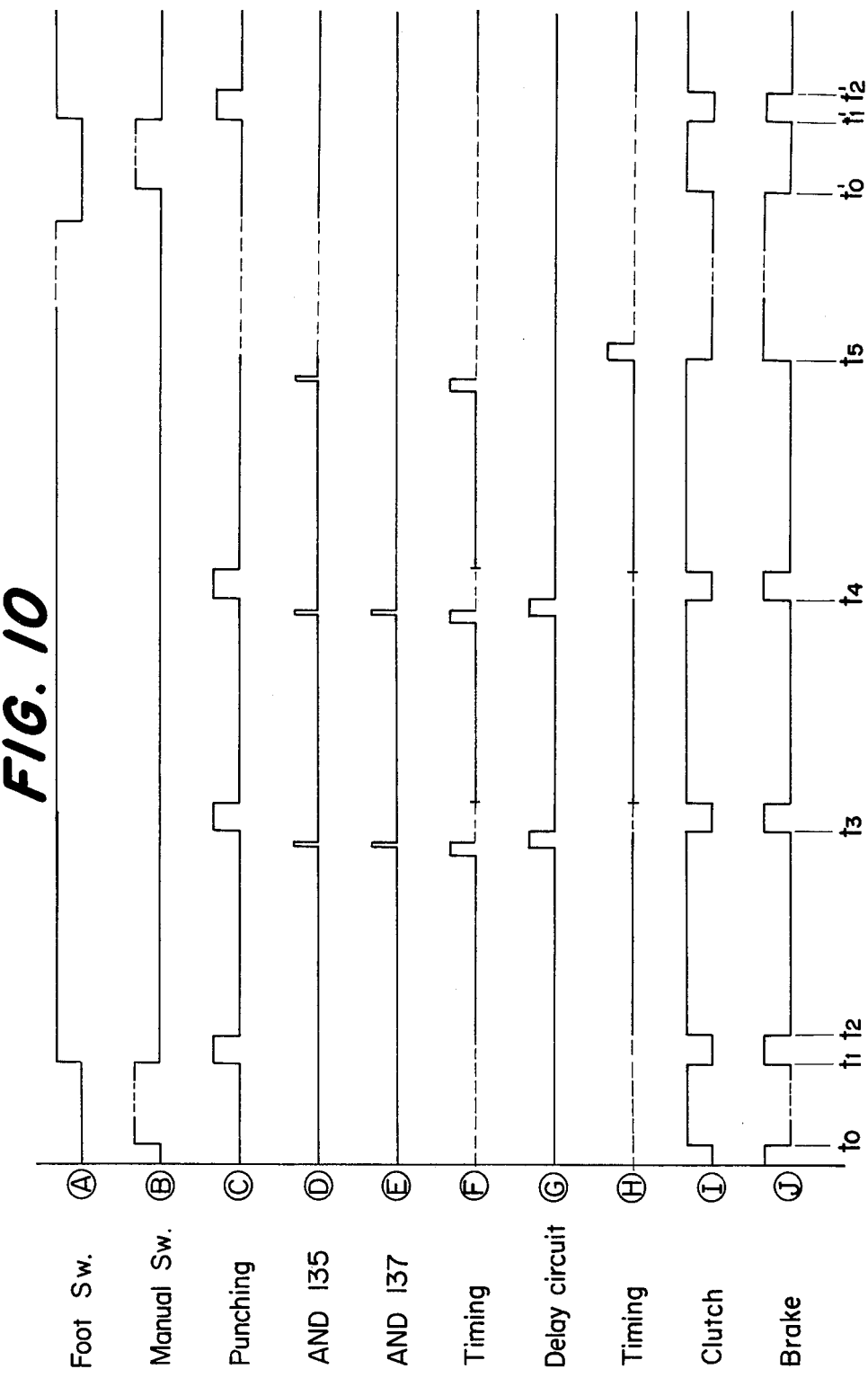

AUTOMATIC PHOTOGRAPH PRINTING CONTROL SYSTEM

This is a continuation of application Ser. No. 340,163, filed Mar. 12, 1973, now abandoned.

BACKGROUND OF THE INVENTION

This invention relates to an automatic photograph printing control system, and more particularly to an automatic control system for effectively improving an efficiency of printing works by processing the necessary information concerning a negative film to be printed by means of a magnetic recording device, and still more particularly to an automatic control system suitable for printing a color film with no irregularity.

Printing work of a large volume of photographs to be carried out by mechanical operation goes ahead with complete automation for a guide. However, at the present stage or to some extent, complete elimination of manual manipulation is very difficult or impossible. In a sense, it does not necessarily follow that the elimination of manual handling is always desirable.

A process of reaching the complete automation cannot be expressed by simple algebra and an effort for attaining the goal progressively increases as the degree of completeness desired rises. It is attributable to the fact that a photograph is not a simple mechanical outcome, but contains visual-psychological elements and that simplification of the information contained in the negative film is inevitable in a process of automation and automatization concerning the contents of a predetermined extent produces new exception. These backgrounds result in the requirement of manual handling. These circumstances bear a close resemblance to the difficulties for raising the purity of chemical substances, for example.

Thus, although the working efficiency is surely improved by any type of automation system, a yield rate may not be improved. From this point of view, the automatization of printing works does not necessarily improve the efficiency of printing operations on the whole.

Manual handling that is required to be introduced may be classified roughly into two categories:
  a. Selection between an ineffective frame which is not worthy to be printed because of insufficient exposure and so called "out of focus" and the like and an effective frame worth printing.
  b. Correcting operation of color failure and abnormal light negatives and the like which cannot be printed under appropriate exposure by ordinary automatic exposure control systems.

From this point of view, in order to obtain satisfactory prints, manual handling becomes necessary. However, the introduction of manual operation naturally requires an expert and lowers its working efficiency. The present invention deals with problems for optimizing assignment of works conducted by manual and mechanical operations.

DESCRIPTION OF THE PRIOR ART

Generally, in order to effectively carry out automatic printing works, a position signal corresponding to each frame in the negative film, a density signal representative of an average density or any appropriate density specified by either each point or whole frames in the negative film or the combination thereof correcting information concerning color failure as well as abnormal light negatives and the like, and other data to be used for printing works is required, should be provided and processed in synchronism with the operation of a printer. In addition, in complete automatization, a comparatively long negative film comprising a large number of frames, which is prepared by joining a number of films end to end, should be treated in one continuous operation without requiring intermediate manual handling.

In one type of automatic photograph printing control system, an exposure time for each frame may be automatically controlled by means of an exposure control timer driven in accordance with the film density information detected by photosensing elements. The positioning of respective frames of the film, however, is carried out by manual operation. In this case, comparatively fine control may be accomplished by using the density signal detected by conventional methods, but it is not satisfactory to process all sorts of films under appropriate exposure. As the result, the manual adjustment of exposure time is inevitable in order to obtain uniform prints from different films in comparatively broader range.

In the system described above, if the consecutive positioning of the frames in the negative film, once having been set at a correct position, is performed by counting the series of perforations disposed on the both sides of the film (and used for feeding the film during photographing) the relative position between the frame and the perforation will little by little get out of an expected correct position as it advances forward because the procession of the frames may not always correspond exactly to the number of perforations. Assuring that the positioning of each frame could be made precisely by virtue of the counting method mentioned above, the complete automatic operation may, however, be limited to only a batch of film since the joined portion of films must be advanced manually as the machine cannot control its portion. With all the conditions being satisfied, it should be understood that the selection or skipping of desired particular frames is impossible by using conventional systems.

Like these, most of ordinary conventional printers may be referred to as an automatic printer with exposure manual correction mechanisms wherein mechanical printing and manual handling are performed in one set of machine or printer. On the other hand, a complete auto-printer utilizing a computer as a coupling medium between mechanical printing and the measurement of exposure light is also known to those skilled in the art as an auto-printer with a prereader. In this type of machine, troublesome manual handling is not required, but the designation of effective and ineffective frames is impossible and fine manual correction cannot be made.

SUMMARY OF THE INVENTION

Briefly, the invention is to provide a printing system and a device for automatically processing and controlling a negative film by means of a magnetic recording device to achieve an effective printing operation and an economization of associated works, especially applicable for printing a colored negative film.

Various films, which are requested to be printed by customers, are at first connected together into a continuous film by a special bond or paste after development and rolled on a suitable spool and then set on the reader or prereader which reads out necessary information with respect to the density. The effective frames are visually inspected by the operator and the position of each effective frame is recorded on the negative film. The readout information is stored in the magnetic recording device in the form of the corresponding digital fashion. Paralleling with this operation, independent necessary information, that is, the code number of shop or customer, can be recorded in another channel of the magnetic recording device, if required The reader is provided with a projector which is used for film inspection and projects a film frame pattern on a screen. Generally, negative films from customers are not necessarily photographed with appropriate exposure, so that the selection or skipping of the unusable frames may sometimes be required. The system or device according to this invention has made possible the printing of the frames under appropriate exposure by using the data stored on the magnetic film itself in the form of a notch, for example, at the stage of inspection.

The additionally recorded information may be used to facilitate an arrangement of finished prints, an efficiency of automatic cutting of a long negative film and also an economization of the delivery of an application bill, etc.

The magnetic recording means processed by the reader and the batch of continuous film rolled on the spool are operatively installed in the printing machine as a set to perform actual printing operation. In this case, the digitalized or quantized film information recorded in the magnetic recording device are read out in synchronism with a position signal on the negative film detected with respect to the effective frame. The read out information, is introduced as correcting signal to an exposure control circuit after having been decoded and compensates the film information detected at the printing operation to finally control a shutter mechanism with filters.

Needless to say, the demand for a more complete automatic photograph printing control device is great if the actual situation of labor shortage and the rise in labor costs are taken into consideration. In addition, the development of an automatic photograph printing control apparatus is desirable in view of health administration.

It is therefore an object of the present invention to provide an automatic photograph printing control system and apparatus having improved printing capability.

Another object of the present invention is to provide a system and apparatus for automatically printing a negative film with appropriate exposure by means of a magnetic recording device.

A further object of the present invention is to provide a system and apparatus for automatically skipping ineffective frames of the negative film at the stage of printing thereby attaining the improvement of a yield rate.

A still further object of the present invention is to provide an automatic photograph printing control system having function for facilitating associated works after printing.

In short, the principal technical conception of the present invention includes the following three features:

a. At least two operations of the selection of effective and ineffective frames and the decision of correction value of exposure are carried out in one lot prior to printing works. The result of the former is recorded in the negative film itself and the result of the latter is provisionally stored in a magnetic or a similar recording device.

b. Two operations mentioned above are performed by using a reader which is operated in the relation of OFF-LINE from a printer with the help of manual handling.

c. The magnetic or similar recording medium into which data is stored at previous stage and the corresponding negative film is mounted as a set on the printer which is separated from the prereader. The printer detects the effective frames and performs the printing operation continuously while correcting the value of exposure with the correction value recorded in the magnetic or similar recording medium.

BRIEF DESCRIPTION OF THE DRAWINGS

These and other objects, features and advantages of the invention as well as the invention itself, will become more apparent to those skilled in the art in the light of the following detailed description taken in consideration with the accompanying drawings wherein like reference numerals indicate like or corresponding parts throughout the several views wherein:

FIG. 1b is a schematic block diagram of a mechanical and electrical control system in accordance with the present invention when used for carrying out automatic printing works by using the magnetic recording device as well as the negative film processed and prepared by the reader of FIG. 1a.

FIG. 2 is a sketch prepared for explaining the detection of correct position of a negative film.

FIG. 3 is a detailed circuit diagram of a position detector circuit 41 of FIG. 1a.

FIG. 5 is a detailed electrical circuit diagram of a control circuit 45 of FIG. 1a.

FIG. 6 is a more detailed electrical circuit diagram of a density-compensation-value detection circuit 59 of FIG. 1a.

FIG. 10 is a timing diagram for explaining the operation of the reader.

DESCRIPTION OF THE PREFERRED EMBODIMENT

Figure 1A:
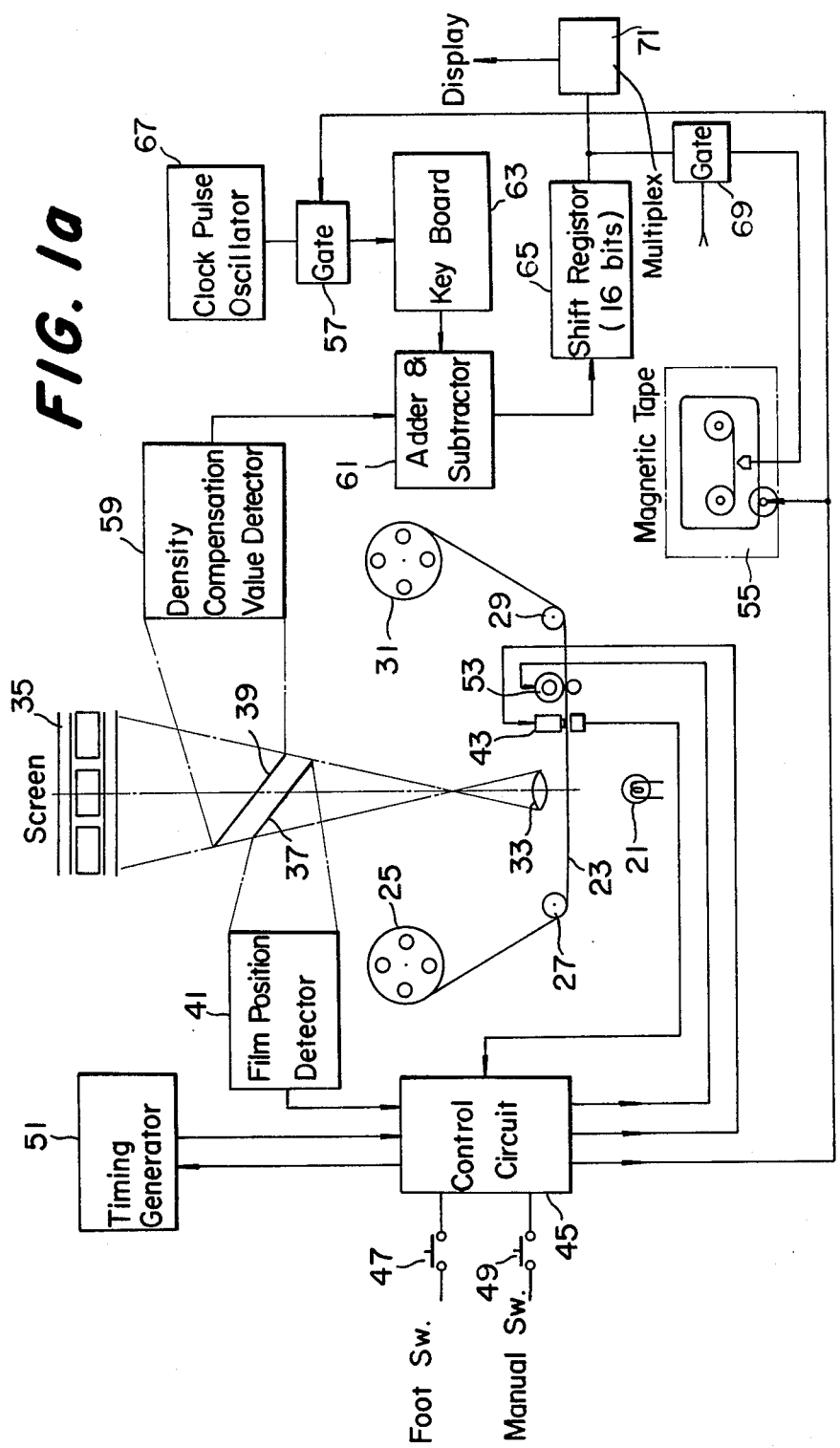
FIG. 1a is a schematic block diagram of a mechanical and electrical control system in accordance with the present invention when used for inspecting a negative film and recording in the magnetic recording device the necessary information to be used for printing.

Referring now to the drawings, there is illustrated a preferred embodiment of a reader of this invention when used for checking the negative film and for recording in the magnetic recording device or magnetic tape the necessary information to be used upon printing. A light source 21 emits light beams with constant intensity and illuminates a negative film 23 fed from spools 25 to 31 through two rollers 27 and 29. The light beams transmitted through the negative film 23 are focused by an optical device 33 and directed to half mirrors 37 and 39. The light beams reflected by the half mirrors 37 and 39 are introduced to a position detector circuit 41 and a density-compensation-valve detection circuit 59, respectively. On the other hand, light beams transmitted through the half mirrors 37 and 39 are illuminated on a screen 35 to project the pattern of the negative film. A control circuit 45 is provided with input terminals used for receiving signals from the position detector circuit 41, a puncher 43, a foot switch 47, a manual switch 49 and a timing generator 51 and also output terminals used for applying control signals to the puncher 43, the timing generator 51, a brake 53, a magnetic tape 55 and a gate 57. The position detector circuit 41 applies a control signal to the control circuit 45 only when the frame of the film is located at the place where the frame position is to be detected. At this stage, if the foot switch is not released, it means that the negative frame located at the place where the frame position is to be detected is judged as effective frames. On the other hand, if the operator, who is visually inspecting the condition of a series of negative frames, releases the foot switch 47 before the frame is stopped, it means that the frame is handled as an ineffective frame. Simultaneously, the foot switch 47 and the manual switch 49 are used for automatic and manual feeding of the negative film, respectively. The timing generator 51 is a counter to generate a plurality of timing pulses determined by the length of frame as a function of film speed as will be explained later and the start of counting is controlled by the signals from the control circuit 45. The puncher 43 is provided with a blade of certain shape and puts a mark or notch on the predetermined position when the effective frame is detected. These notches are used to detect the effective frames during printing process. The brake 53 is associated with a clutch (not shown) and driven by the control signal from the control circuit 45 to stop the feeding of the film 23.

The gate 57 is a switch circuit which is used to provide control clock pulses from a clock pulse oscillator 67 to a keyboard 63, an adder/subtractor 61, a register 65 and the magnetic recording device or magnetic tape 55 in response to the control signal from the control circuit 45. The adder/subtractor network 61 has input terminals used for receiving output data from the density-compensation-value detection circuit 59 and the keyboard 63 and an output terminal used for applying the corrected value processed at the adder/subtractor 61 to a shift register 65 whose output is connected to the magnetic tape 55 through a gate 69.

When the control signals from the control circuit 45 is introduced to the magnetic recording device or magnetic tape 55 and the gate 57, the data from the density-compensation-value detection circuit 59 corrected at the adder/subtractor 61 by preset data manually stored in the keyboard 63 are recorded in the magnetic tape 55 through the shift register 65 and the gate 69. In this case, all the functions of shifting and adding or subtracting data and other information are processed in accordance with the control clock pulses from the clock pulse generator 67.

The gate 69 is a selector switch to be used when other information from the outside is recorded in other channels of the magnetic tape 55 independently or in association with the data processing by the reader of FIG. 1a. The output of the register 65 may be connected to utilization devices such as a display device and others.

Figure 1B:
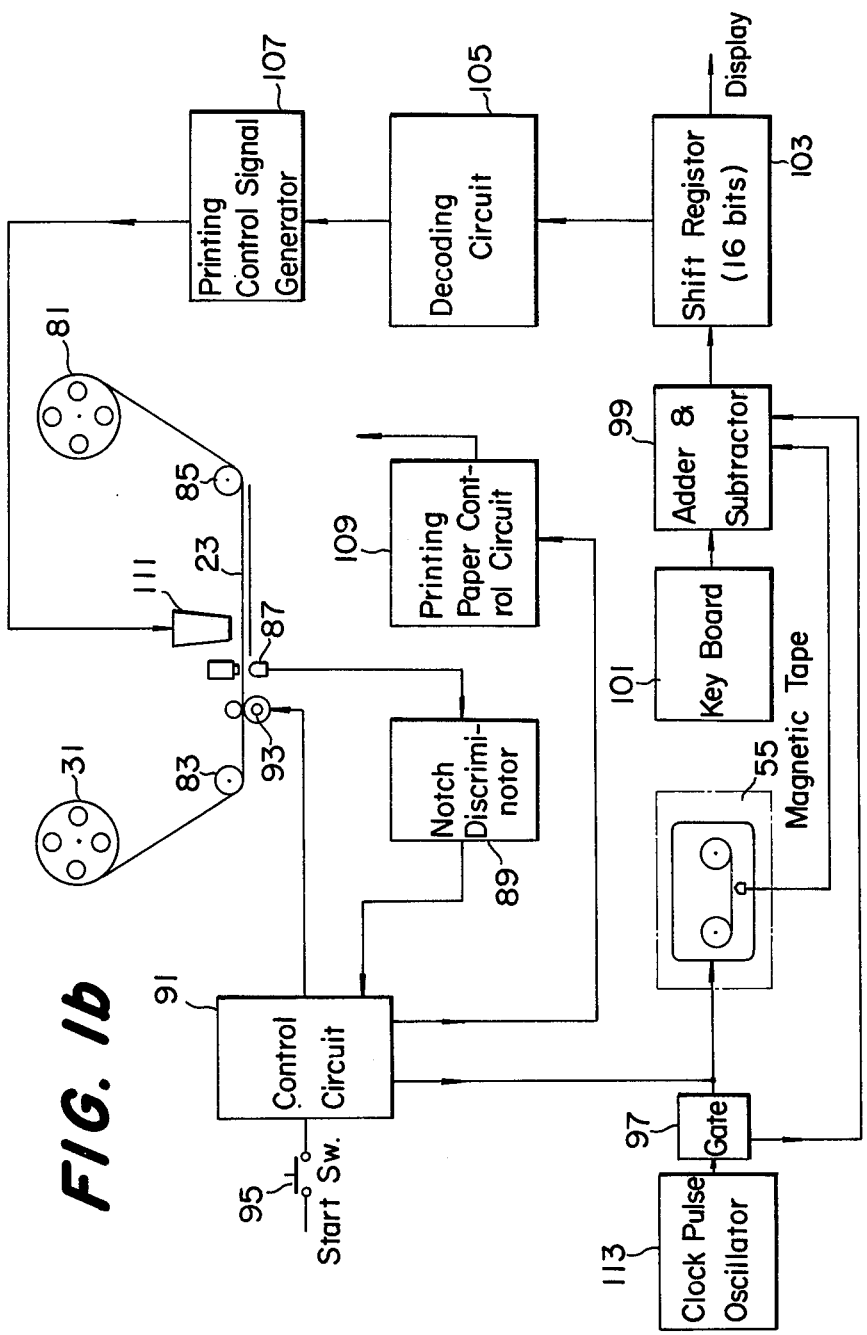

Referring to FIG. 1b, there is illustrated a preferred embodiment of a printer of this invention when used for performing automatic printing operation by using the magnetic tape and the negative film rolled in the spool processed and prepared by the reader of FIG. 1a. The magnetic tape 55 and the spool 31 processed and prepared by the reader of FIG. 1a are first mounted in place of the printer, and one end of the film 23 is coupled to a taken-up spool 81 through two rollers 83 and 85. Along the film 23 is disposed a notch detector 87 whose output is connected to a notch discrimination circuit 89. A control circuit 91 is provided with input terminals used for receiving signals from a start switch 95 and the notch discrimination circuit 89 and output terminals used for applying control signals to a brake 93, the magnetic recording device 55, a gate 97 and a printing paper control circuit 109. The brake 93 is associated with a clutch (not shown) and driven by the control signal from the control circuit 91 to control the feeding of the film 23. With the start switch 95 handled, the printer shall be put into operation.

When the notch detector 87 detects a notch and the notch discrimination circuit 89 judges that the notch is effective for printing, the control circuit 91 applies respective control signals to the brake 93, the magnetic tape 55 and the gate 97 thereby stopping the feeding of film 23 and commencing the reading of data from the magnetic tape 55. An adder/subtractor circuit 99 is provided with input terminals used for receiving signals from the magnetic tape 55, the gate 97 and 107 and an output terminal used for applying data to a register 103. Besides, the gate 107 has an input terminal for receiving data from a keyboard 101 and a command signal from the outside, so that the read out data from the magnetic recording device 55 is shifted to the shift register 103 either as it is or after having been compensated at the adder/subtractor 99 with the preset data in the keyboard 101. In this case, all the data is processed by the control clock pulses from a clock pulse oscillator 113 by way of the gate 97. The shift register 103 has output terminals used for applying the resultant data to a decoder circuit 105 and another utilization device such as a display, etc. The data relating to the density and color components (Y, M and C), supplied in parallel from the register 103, is dissolved in conformity to respective magnitude and stored in the decoding network 105. An exposure control device 111 is provided with input terminals for receiving signals from the decoder circuit 105, the gate 107 and a film information detector 79 and output terminals for applying a control signal to a shutter mechanism 71 containing filters. The shutter mechanism 71 therefore may be controlled with either a resultant data signal from the keyboard 101 and the film information detector 79 or a resultant data signal from the magnetic tape 55 and the film information detector 79, or a combined data signal from the magnetic tape 55, the keyboard 101 and the film information detector 79. The first control made is a conventional control system and the second and third ones are preferred control systems in accordance with the present invention. The conventional control mode may be used when the two control modes of operation according to the present invention are out of order.

A light source 73 emits light beams and illuminates a negative film 23. The light beams passing through the film 23 are focused through an optical device 75 and directed to a half mirror 77. The film information detector 79 receives the reflected light beams by way of the half mirror 77 to detect the film in the same manner as described with respect to the density detector in FIG. 1a. On the other hand, the light beams transmitted through the half mirror 77 are applied to a printing paper 115 through the shutter mechanism 71.

The printing paper control circuit 109 drives paper feeding mechanisms (not shown) in response to the control signal from the control circuit 91.

Figures 2, 3:
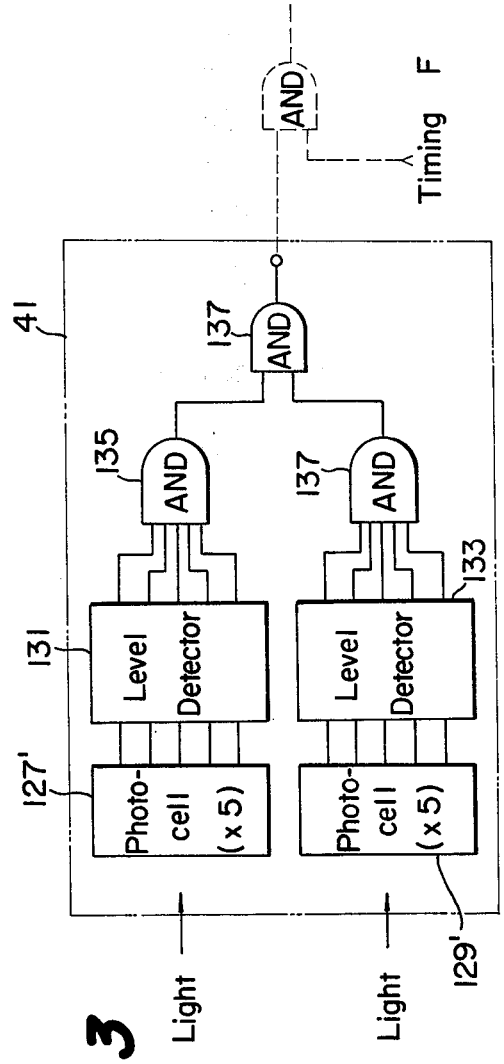

FIG. 2 shows a sketch for explaining the detection of effective frames and notches given by the puncher 43. In the drawing, the film 23 is provided with two kinds of notches, 121 and 123, having different size and shape. The notch 121 is provided to the edge portion of the film before it is rolled into the spool to indicate the joined section of the films, and the notch 123 is given by the puncher 43 (FIG. 1a) to the edge portion of the film when the effective frame 125 is detected at the stage of inspection. Two groups of photoelectric element or photocell, 127 and 129, each having five elements, are disposed in the position detector circuit 41 of FIG. 1a with a distance of L which is determined by the length of standard frame to detect effective frames.

FIG. 3 shows a more detailed circuit diagram of the position detector circuit 41 of FIG. 1a. Photocell circuits 127' and 129', level detection circuits 131 and 133 or AND gates 135 and 137 are identical to each other in characteristics and circuitry, so that only one circuit shall be explained. The photocell circuit 127' is a detection circuit containing five photocells 127 of FIG. 2 and induces potential corresponding to the intensity of light and applies the output signals to the level detector 131. The level detector 131 detects inputs which exceed a predetermined level and applies the binary 1 to the AND gate 135. Application of the binary 1 to all the inputs enables the AND gate 135 which, in turn, supplies the binary 1 to an AND gate 139. As will be understood from the foregoing description, the AND gate 139 establishes when all the photocells receive light exceeding the predetermined level. An active element like a photocell is more desirable than passive ones in view of operation speed, sensitivity, linearity and temperature characteristics.

Figure 4:
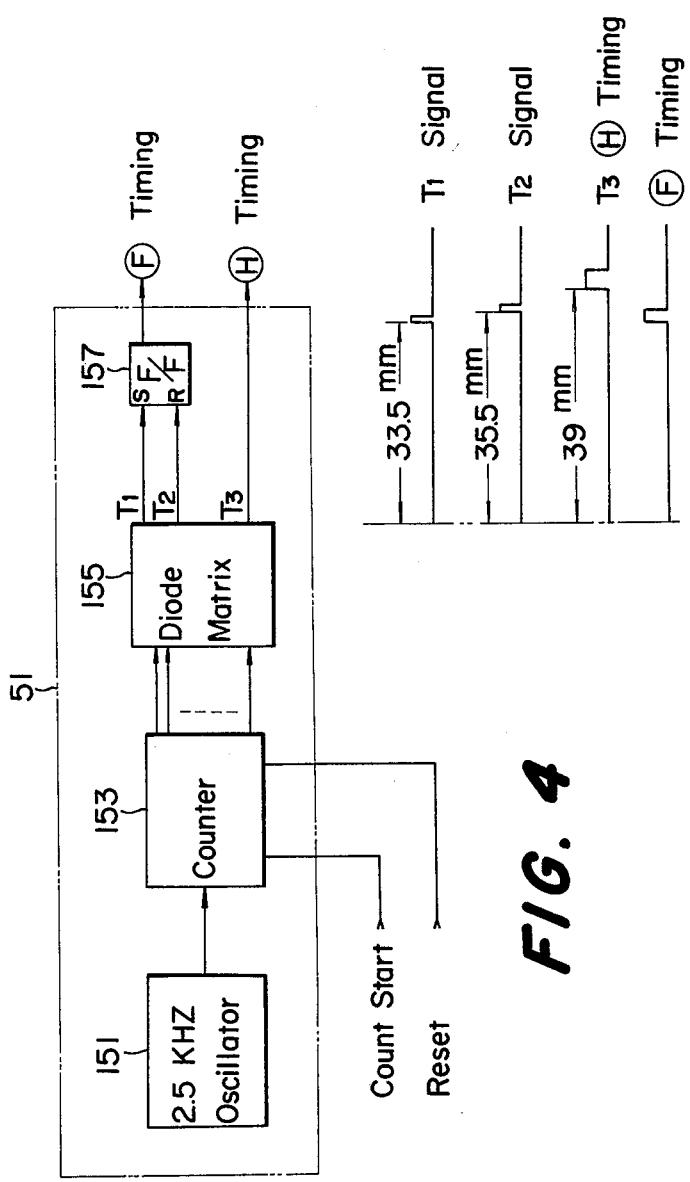
FIG. 4 is a detailed circuit diagram of a timing generator 51 of FIG. 1a and a diagram showing timing relations generated thereby.

FIG. 4 shows a more detailed circuit of the timing generator 51 of FIG. 1a and the relation of timing pulses used for stopping the effective frame to the desired position. An oscillator 151 oscillates at a frequency of 2.5 KHz. A counter 153 is provided with input terminals used for receiving pulses from the oscillator 151 and count start signal and reset signal from the control circuit 45 (FIG. 1a) and a plurality of output terminals used for applying the counted signals to a diode matrix circuit 155 and starts counting in response to the count start signal and reset by the reset signal. The diode matrix circuit 155 produces timings $T_1$, $T_2$ and $T_3$ determined as a function of the feeding speed of the film and a standard length of the frame. The output terminals corresponding to the timing $T_1$ and $T_2$ are coupled to set and reset terminals of a flip flop 157, respectively. The output of flip flop 157 and the timing $T_3$ are supplied to the control circuit as timings (F) and (H), respectively. As is clearly shown in the timing diagram, the counter 153 starts counting upon the receipt of the count start signal and supplies the timing $T_1$ to the set side of the flip flop 157 at a time corresponding exactly to the length 33.5 mm of the film, and then timing $T_2$ to the reset side at a time corresponding exactly to the length 35.5 mm. Consequently, the timing (F) has a pulse width corresponding to a length of 2 mm of the film. The timing (H) is also generated at a time corresponding exactly to the length 39 mm of the film.

Figure 5:
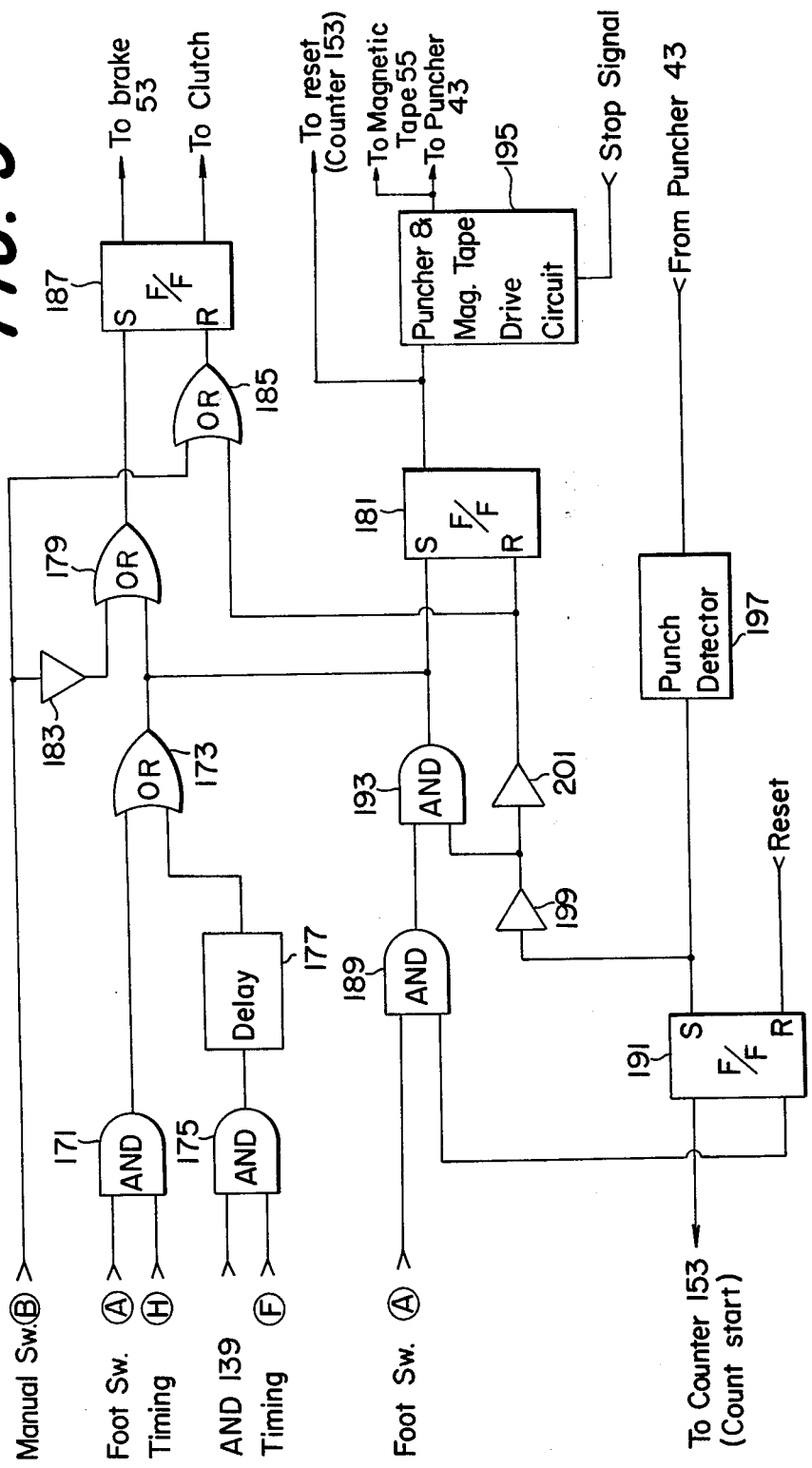

FIG. 5 is a detailed electrical circuit diagram of the control circuit 45 of FIG. 1a. In the drawing, an AND gate 171 is provided with input terminals used for receiving the signal (A) from the foot switch 47 and the timing (H) and an output terminal connected to one of inputs of an OR gate 173. An AND gate 175 is provided with input terminals used for receiving signals from the AND gate 139 and the timing (F) and an output terminal connected to a delay circuit 177 whose output is coupled to another input of the OR gate 173. The output of the OR gate 173 is connected to one of inputs of an OR gate 179 and the set side of a flip flop 181. The signal (B) from the manual switch 49 is connected to one of inputs of an OR gate 185 on one hand and to another input of the OR gate 179 through an inverter 183 on the other hand. The output of the OR gate 179 is connected to the set side of a flip flop 187. The flip flop 187 has two output terminals connected to the brake 53 and a clutch. An AND gate 189 is provided with input terminals used for receiving signals from the foot switch 47 and the reset side of the flip flop 191 and an output terminal connected to an AND gate 193. The output of the AND gate 193 is connected to the set side of the flip flop 181. The output of the flip flop 181 is connected to a puncher and magnetic tape drive circuit 195 and the counter 153, respectively. A punch detector circuit 197 has input terminals used for receiving operation-end signals of the puncher 43 and output terminals used for applying its output to the flip flop 191 and an inverter 199. The output of the set side of the flip flop 191 is connected to the count-start-signal receiving terminal of the counter 153 (FIG. 4). The output of inverter 199 is connected to another input of the AND gate 193 and an inverter 201 whose output is coupled to the reset side of the flip flop 181 and another input of the OR gate 185. The output of the OR gate 185 is coupled to the reset side of the flip flop 187. Relative operation of whole circuit will be explained later.

Figure 6:
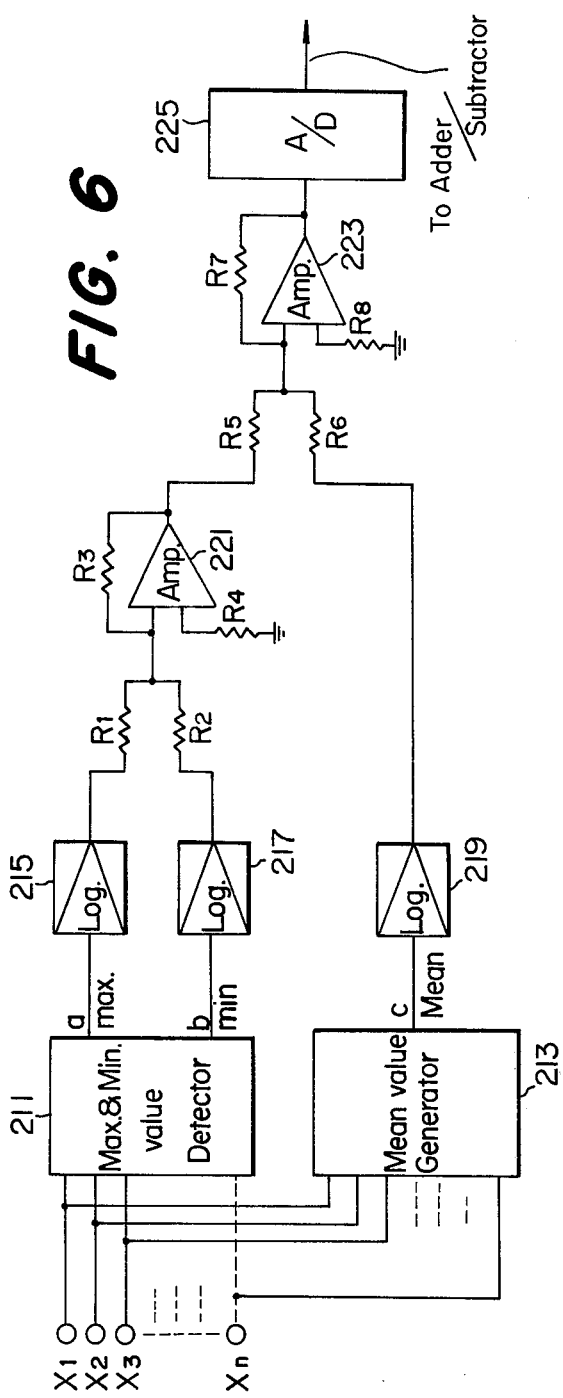

FIG. 6 shows a more detailed electrical circuit diagram of the density compensation value detection circuit 59 of FIG. 1a. Terminals shown by $X_1$ through $X_n$ represent light receiving elements, or preferably photocells, disposed in the form of mesh with respect to the frames and connected in parallel to inputs of a max.-min. value detection circuit 211 and a mean value detection circuit 213. The circuit 211 detects the maximum and the minimum values from the inputs $X_1$ through $X_n$. The maximum value at the output terminal $a$ and the minimum value at the output terminal $b$ of the circuit 211 are supplied to logarithmic amplifiers 215 and 217, respectively. The mean value detection circuit 213 generates a mean value with respect to the inputs $X_1$ through $X_n$, and applies it to a logarithmic amplifier 219 from the output terminal C. The outputs of the logarithmic amplifiers 215 and 217 are joined to each other through resistors $R_1$ and $R_2$ and connected to one of inputs of an operational amplifier 221. The output of the amplifier 221 is fed back to the input of the amplifier 221 through a resistor $R_3$ on one hand, and also connected to one of inputs of an operational amplifier 223 through $R_5$ on the other hand. Another input of the amplifier is grounded through the resistor $R_4$. The output of the amplifier 219 is also connected to the said input of the operational amplifier 223 through a resistor $R_6$. The output of the amplifier 223 is directly connected to a suitable analog/digital converter 225 on one hand and fed back to the said input of the amplifier 223 through a resistor $R_7$ on the other hand. Another input terminal of the amplifier 223 is grounded through a resistor $R_8$. The analog/digital converter 225 supplies the digitalized density information of the frame to the adder/subtractor 61 of FIG. 1a.

Figure 7:
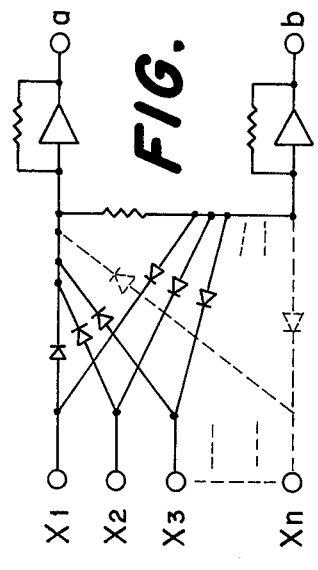
FIG. 7 shows a preferred embodiment of a max./min. value detector 211 of FIG. 6.
Figure 8:
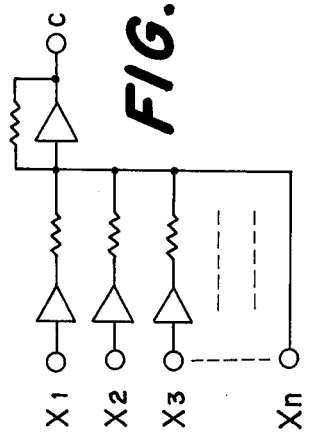
FIG. 8 shows a preferred embodiment of a mean value detector 213 of FIG. 6.

FIG. 7 and FIG. 8 are the max.-min. value detection circuit 211 and the mean value detection circuit 213 shown in FIG. 6. No reference has been made since these circuits are considered to be well known to those skilled in the art. Explanation on these circuits, therefore, shall be omitted.

Figure 9:
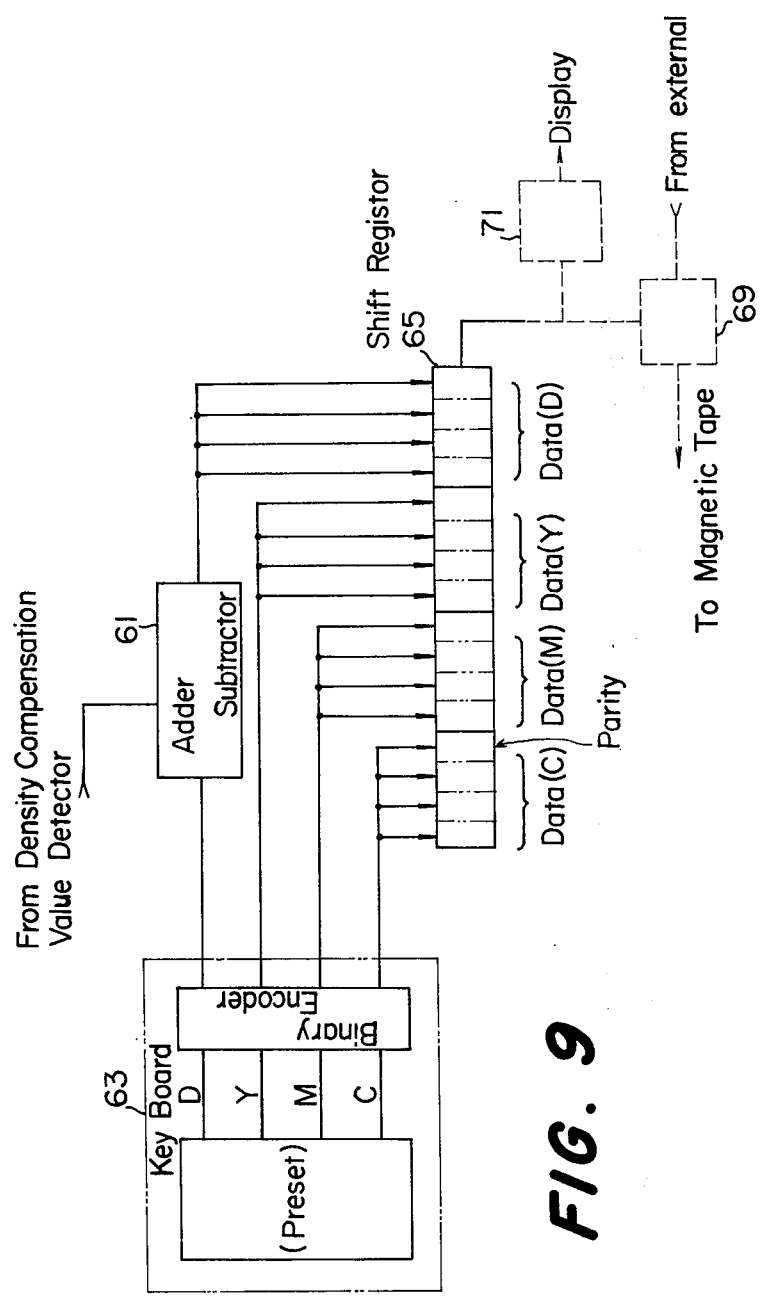
FIG. 9 is a diagram showing a data processing system comprising an adder/subtracter 61, a keyboard 63 and a shift register 65.

FIG. 9 is a block diagram prepared for explaining a data processing system comprising the adder/subtractor circuit 61, the keyboard 63 and the shift register 65. In the keyboard 63, command data with regard to density and color components (for example, Y, M and C) are set in advance, and each is communicated with a binary encoder by means of a lead D, Y, M or C. The density information block D is connected to a 4-bit register which constitutes a part of the 16-bit register through the adder/subtractor circuit 61, and respective blocks Y, M and C for color information are also connected to 4-bit registers specifically assigned to them through a compensation circuit 231 through dial setting. Of four bits, three bits are used for storing data and one bit as a party bit for error detection. All the data stored in the keyboard are transferred to the shift register 65 by the timing pulses from the clock pulse generator 67 upon the receipt of control signals. In this case, only the density information from the keyboard 63 is corrected at the adder/subtractor circuit 61 with the data detected by the density compensation value detection circuit 59. The color components Y, M and C are also corrected by the present data stored in advance at the compensation circuit 231 to be set by the dial.

FIG. 10 is a timing diagram, showing the function of the reader and will be described later in conjunction with following explanation concerning the operation of the reader of FIG. 1a.

The overall construction of the embodiment illustrated in FIGS. 1a–10 can be summarized as follows:

The automatic printing control system of the present invention is principally constituted by a reader and a printer operated in the relation of OFF-LINE system with the reader, wherein the reader comprises in effective frame stop position detecting 127, 129, 37, 41, 51, 47, 53 as well as recording means 43, an effective frame visual inspection means 21, 33, 35, 49, manual input means of exposure light correcting value relating to color failure and abnormal light negatives 63, an arithmetic means 59 for density exposure light correcting value concerning density failure and a density measuring means therefor 21, 33, 39, $X_1 - X_n$, an information recording means 61, 65, 69, 55, a reader control means 45, 67, 57, 171, 175, 173, 177, 179, 183, 187, 189, 191, 193, 199, 201, 181, 197, 195 for successively operating the respective units and means, which is constituted by logic circuitry, while the printer comprises automatic printer constituents 31, 81, 83, 85, 115, 73, 75, 71, 77, 79, 111, a detector and stop means 87, 89, 93 for designated effective frames, an exposure light intrinsic value correction means 55, 103, 105, 111, a printer control means 95, 91, 113, 97 for successively operating the respective constituents and means, which is constituted by logic circuitry.

In addition, more concrete construction of the respective fundamental constitutional elements including control means for the reader and the printer can be summarized as follows:

In the reader

The effective frame stop position detecting as well as recording means includes a negative film frame position detecting mechanism 127, 129, 37, 41, 51 for determining the stop position of respective negation films to be used for printing, a negative film automatic feed and stop mechanism 47, 53, and a negative film mark 123 forming mechanism 43 for determining the stop position of effective frames upon recording and to be based upon printing, and the effective frame visual inspection means includes a display mechanism 21, 33, 35 and a negative film manual feed mechanism 49, and the calculating means for density exposure light correcting value concerning density failure and a density measuring means therefor includes an optical system 21, 33, 39 for forming a light to be transmitted through the negative film, a density measuring mechanism $X_1 - X_n$ of the negative film and a correcting value calculating unit 211, 213, 215, 217, 219, 221, 223, 225, and the information recording means consists of a write-in mechanism 61, 65, 69, a recording mechanism 55, and a recording medium 55, and the reader control means for successively operating the respective units and means is constituted by logic circuitry for placing respective portions in operating condition only when the automatic feed mechanism is set to operating state, operating the automatic stop mechanism every time the frame position detection mechanism detects each frame, operating the negative film mark forming mechanism when the automatic stop mechanism is actuated and the negative film is stopped, calculating density exposure light correcting value by driving the arithmetic means and the density measuring means therefor, recording color exposure light correcting value from the manual input means and density exposure light correcting value into the information recording means, and interrupting automatic feed function as well as automatic write-in function of color exposure light correcting value and density exposure light correcting value into the recording means when the automatic feed mechanism is released.

In the printer

The automatic printer constituents include a negative film setting mechanism 31, 81, 83, 85, a printing paper feed mechanism 115, 109, an optical system 73, 75, 71 for printing, a density measuring unit 77, 79 and an exposure light control mechanism 111, and the detection and stop mechanism for designated effective frames includes a mark detection mechanism 87, 89 and a negative film feed and stop mechanism 93, and the exposure light intrinsic value correcting means includes a readout mechanism 55, 103, 105 from the recording medium 55 and an arithmetic unit 111 of compensating the exposure light intrinsic value with exposure light correcting value, and the printer control means for successively operating the respective constituents and means is constituted by logic circuitry for operating the negative film stop mechanism when the mark detection mechanism is actuated, and operating the readout mechanism and the arithmetic unit when the negative film stop mechanism is actuated.

In the above description, the density exposure light correcting value is a correction value for performing the compensation of exposure light concerning the density failure and obtained from the circuit 59, and the color exposure light correcting value is a correction value for performing the compensation of exposure light concerning the color failure and abnormal light negatives and manually inputed from the keyboard 63. In addition, the exposure light intrinsic value is a basic value of exposure light and compensated by the above mentioned two correcting values and automatically detected at the stage of printing by the film information detection device 79 and applied to the exposure control device 111 to control total exposure light of respective color components in uniform value or balanced magnitude, thereby making the exposure light relating to standard negatives to be appropriate.

In operation, the first effective partition in the film 23 set at the reader must be positioned at a correct position by means of the manual switch 49. In FIG. 5, the manual switch signal B in the state of the binary 1 is applied to the reset side of the flip flop 187 through the OR gate 185 on one hand and also in the state of the binary 0 to the set side of the flip flop 187 through the inventer 183 and the OR gate 179, so that the condition of the flip flop 187 is thereby changed. At this stage, the brake is released and the clutch is applied to feed the film 23. The feeding of the film 23 must be stopped by releasing the manual switch at a proper stage. In FIG. 10, the time interval from $t_0$ to $t_1$ corresponds to the signal B for manual operation. During this time interval, the signals I and J are given from the control circuit 45 (FIG. 5) to the clutch and the brake 53, respectively.

When the foot switch 47 is activated, the reader receives the signal A and starts automatic operation. In FIG. 5, the signal A from the foot switch 47 enables the AND gate 189 as the reset side of the flip flop 191 is in the state of the binary 1, and the set side of the flip flop 181 is thereby set to the binary 1 through the AND gate 193. This signal is fed to the puncher and magnetic tape drive circuit 195 and the counter 153 in the timing generator 51, thereby performing the punching, starting the operation of the magnetic tape 55, resetting the counter 153 and applying clock pulses from the clock pulse oscillator 67 to a series of the data processing circuits. At this stage, the density information from the density compensation value detection circuit 59 is corrected at the adder/subtractor 61 with data previously stored in the keyboard 63 and introduced in parallel to the 16-bit shift register 65, and then recorded in the magnetic tape 55 through the gate circuit 69. These recording operations are performed within the predetermined time interval (signal C) during which the puncher and magnetic tape drive circuit 195 is in the state of the binary 1.

In FIG. 5, the punch detector circuit 197 supplies a punch end signal to the set side of the flip flop 191 and the inverter 199 to change the state of the flip flop 191, thereby applying the count start signal to the counter 153 (FIG. 4). The signal of the binary 0 at the output of the inverter 199 disenables the AND gate 193 and is inverted by the inverter 201 to offer the binary 1 to the reset side of the flip flop 181 and the flip flop 187 through the OR gate 185, thereby changing the state of the flip flops 181 and 187. At this stage, the brake 53 is released and the clutch is engaged and the feeding of the negative film 23 is commenced and the counter 153 starts counting.

If the AND gate 139 of FIG. 3 establishes when the timing F is introduced to the AND gate 175 of FIG. 5, the output of which is delayed via the delay 177 for a time corresponding to the length 3 mm of the film and applied to the set side of the flip flop 187 through the OR gates 173 and 179 on one hand and also to the set side of the flip flop 181 through the OR gate 173 on the other hand. At this stage, the function of the reader is returned to the starting condition of automatic operation. The above mentioned operation corresponds to the time interval $t_1$ through $t_3$ in FIG. 10.

Let it be assumed that the AND gate 139 of FIG. 3 is not established when the timing F is provided. In this case, the timing H is introduced unconditionally to the AND gate 171 of FIG. 5, and the output of which is applied to the set side of the flip flop 187 through the OR gates 173 and 179 on one hand and also to the set side of the flip flop 181 through the OR gate 173 on the other hand. In paralleling with these functions, another control circuit (not shown) is controlled by the timing (H) to apply a stop signal to the puncher and magnetic tape drive circuit 195. As the result, the puncher 43 and the magnetic tape 55 is not operated to hold the machine at a standstill, but the counter is reset. The operation in this paragraph corresponds to the time interval from $t_4$ to $t_5$ in FIG. 10. In order to operate the machine, the operator is requested to release the foot switch 47 and then handle the manual switch 49. This means that the machine requires manual handling specified by the time interval from $t_0'$ to $t_1'$ (corresponding to the time interval from $t_0$ to $t_1$ at initial condition). The spliced portion results in the non-establishment of the AND gate 139 as described above.

As will be clearly understood from foregoing explanation, the automatic operation of the reader continues as far as the AND gate 139 is established by the timing F, provided that the foot switch is being depressed. In other words, the automatic operation continues as far as an effective film partition is visually observed on the screen by the operator who is inspecting the content of each frame of the negative film. Since the decision of effective frames is completed by the operation of the puncher 43, if an ineffective frame is observed through the screen 35, the foot switch must be released before the puncher and magnetic drive circuit 195 is actuated through the AND gate 175, delay 177, OR gate 173 and flip flop 181. In short, the puncher is automatically actuated due to the fact that an effective frame is present unless manual handling is intervened into this process. The selection of an ineffective frame is performed by interrupting the automatic processing and omitting the punching operation by the operator. The functions make possible the selection and designation of the effective and ineffective frames. The machine can be restarted by the manual switch 49. A reset signal is introduced to the reset side of the flip flop 191 in synchronism with the function of the reader through a suitable control circuit.

The magnetic tape 55 and the spool 31, prepared by the reader (FIG. 1a) are set to the printer shown in FIG. 1b. With the start switch 95 turned on, the control circuit 91 applies control signals to the clutch and the brake 93 for feeding the film 23. The film 23 is then rolled in the taken-up spool 81. When the notches 121 and 123 are detected by the notch detector 87, the notch discrimination circuit 89 discriminates between the notches 121 and 123.

If the notch 123 is detected, the control circuit 91 applies a stop signal to the brake 93 to interrupt the feeding of the film 23 on one hand and also a start signal to the magnetic tape 55 and a change over signal to the gate 97 on the other hand. At this stage, the clock pulses from the timing generator 113 are fed to a series of the data processing circuits through the gate 97.

If the gate is placed under inoperative condition by manual command and the data from the keyboard 101 are interrupted, the information recorded in the magnetic tape 55 is transferred to the signal decoder 105 as it is through the register 103 and maintained there in digital fashion. The data from the decoder 105 and the information from the detector 79 are combined at the exposure control device 111 and then fed to the shutter control mechanism 71. The control system described above is one of preferred embodiments of the present invention which utilizes the magnetic recording device or the magnetic tape upon printing. Another preferred embodiment employing the magnetic recording device in accordance with the present invention is the use of data set manually in advance at the keyboard 101 and will be explained below.

When the output of the keyboard 101 is communicated with the adder/subtractor 99 through the gate 107 by means of manual operation, the information recorded in the magnetic tape is compensated at the adder/subtractor with the data from the keyboard 101 and used as print control signals through the same route with that of previous systems. In this control system, more improvement can be expected with respect to fidelity and compensation of film information, but the control system mentioned above, in general, may be used.

When some trouble happens in the routes of the magnetic recording device 55, the gate 107 is switched by hand to compensate the data detected by the film information detector 79 with the preset data from the keyboard 101. The film information detector circuit 79 is similar to the density compensation value detection circuit 59 (FIG. 6) shown in FIG. 1a and produces the print exposure control signal for the negative film from the pattern reflected by the half mirror 77.

The printing paper control circuit 109 is controlled in synchronism with the print command signal to the negative film and produces signals applicable for driving the printing paper feed mechanism (not shown).

Let it now be assumed that the notch 121 attached in the joined portion of the film 23 is detected by the notch discrimination circuit 89. In this case, the detected signal may not be related to the stoppage of the negative film 23, but used for an automatic cutting and an arrangement of the film after printing. Accordingly, according to the present invention, the intervention of manual handling is inevitable and suitable at the present stage. As the result, the operator can devote himself to the inspection work since the printing work is automatically carried out by the printer separated from prereader, thereby resulting in the improvement of working efficiency.

According to the system of the present invention, in which the magnetic recording device is employed for the purpose of processing print information, two methods may be recommended for effectively performing the works therefor.

One of the methods recommendable for effectively carrying out the work is the employment of a plurality of printers (FIG. 1b) for one reader (FIG. 1a). This method has an advantage of saving the working time since the reading of information from the negative film may be achieved in a comparatively short time when compared with a time for printing. As the result, the working cost for printing is, in general, rather cheap despite that the machine is comparatively complicated and expensive.

Another method suitable for effectively performing the work in accordance with the present invention is the employment of a simple exposure time control device instead of the complicated device or printer as shown in FIG. 1b. This method is especially effective if used in a small chamber since the printer shown in FIG. 1b offers high performance but requires large space. In this case, the workmanship of the printed photograph may be degraded to a certain degree, but this defect may be compensated enough with merits that do not require large space, for example.

Nearly complete automatic processing or printing operation of the negative film is accomplished by the above mentioned system and device representative of one of the embodiments of the present invention. In addition, it succeeded in providing the printed photograph with no irregularity. As will be clearly understood from the foregoing explanation, several sets of printers can be handled by only one operator since it automatically processes the negative film if once set to the machine by the operator.

The printing works may be in general carried out in a chamber especially designed therefor, so that the employment of the system according to the present invention may contribute to the improvement of working environment and health administration since no manual operation is required during printing after the installation of the negative film and the magnetic tape to the printer.

While the principles of the present invention have been described above in connection with one of specific embodiments, it is to be clearly understood by those skilled in the art that various alterations and modifications, as well as the substitution of equivalent elements or circuits for those shown herein for illustration, may be made without departing from the broader scope and spirit of the invention as set forth in the appended claims. The specification and drawings are accordingly to be regarded in an illustrative rather than in a restrictive sense.

What is claimed is:

1. An OFF-LINE automatic photograph printing control system consisting of a reader and a printer wherein said reader comprises:
    a frame stop position detecting as well as recording means including a negative film frame position detection mechanism for determining the stop position of respective negative films to be used upon printing, a negative film automatic feed and stop mechanism and a negative film mark forming mechanism for determining the stop position of effective frames upon recording and to be used upon printing;
    frame visual inspection means including a display mechanism and a negative film manual feed mechanism;
    manual input means of exposure light correcting value relating to color failure and abnormal light negatives;
an information recording means consisting of a write-in mechanism, a recording mechanism and a recording medium; and,
a reader control means for successively operating said respective units and means, which is constituted by logic circuitry so as to place respective portions in operating condition only when said automatic feed mechanism is set to operating state, operate said automatic stop mechanism every time said frame position detection mechanism detects each frame, operate said negative film mark forming mechanism when said automatic stop mechanism is actuated and the negative film is stopped, record color exposure light correcting value from said manual input means into said information recording means, and interrupt automatic feed function as well as automatic write-in function of color exposure light correcting value into said recording means when said automatic feed mechanism is released;

while said printer comprises:
automatic printer constituents including a negative film setting mechanism, a printing paper feed mechanism, an optical system for printing, a density measuring unit and an exposure light control mechanism;
a detection and stop means for designated effective frames, including a mark detection mechanism and a negative film feed and stop mechanism;
an exposure light intrinsic value correction means including a readout mechanism from said recording medium and an arithmetic unit of compensating the exposure light intrinsic value with exposure light correcting value; and
a printer control means for successively operating said respective constituents and means, which is constituted by logic circuitry so as to operate said negative film stop mechanism when said mark detection mechanism is actuated, and operate said readout mechanism and said arithmetic unit when said negative film stop mechanism is actuated.

2. An OFF-LINE automatic photograph printing control system consisting of a reader and a printer wherein said reader comprises:
a frame stop position detecting as well as recording means including a negative film frame position detection mechanism for determining the stop position of respective negative films to be used upon printing, a negative film automatic feed and stop mechanism and a negative film mark forming mechanism for determining the stop position of effective frames upon recording and to be used upon printing;
frame visual inspection means including a display mechanism and a negative film manual feed mechanism;
calculating means for density exposure light correcting value concerning density failure and a density measuring means therefor, including an optical system for forming a light to be transmitted through the negative film, a density measuring mechanism of the negative film and a correcting value arithmetic unit;
an information recording means consisting of a write-in mechanism, a recording mechanism and a recording medium; and a reader control means for successively operating said respective units and means, which is constituted by logic circuitry so as to place respective portions in operating condition only when said automatic feed mechanism is set to operating state, operate said automatic stop mechanism every time said frame position detection mechanism detects each frame, operate said negative film mark forming mechanism when said automatic stop mechanism is actuated and the negative film is stopped, calculate density exposure light correcting value by driving said arithmetic means and said density measuring means therefor, record density exposure light correcting value into said information recording means, and interrupt automatic feed function as well as automatic write-in function of density exposure light correcting value into said recording means when said automatic feed mechanism is released;

while said printer comprises:
automatic printer constituents including a negative film setting mechanism, a printing paper feed mechanism, an optical system for printing, a density measuring unit and an exposure light control mechanism;
a detection and stop means for designated effective frames, including a mark detection mechanism and a negative film feed and stop mechanism;
an exposure light intrinsic value correction means including a readout mechanism from said recording medium and an arithmetic unit of compensating the exposure light intrinsic value with exposure light correcting value; and
a printer control means for successively operating said respective constituents and means, which is constituted by logic circuitry so as to operate said negative film stop mechanism when said mark detection mechanism is actuated, and operate said readout mechanism and said arithmetic unit when said negative film stop mechanism is actuated.

3. An OFF-LINE automatic photograph printing control system consisting of a reader and a printer wherein said reader comprises:
a frame stop position detecting as well as recording means including a negative film frame position detection mechanism for determining the stop position of respective negative films to be used upon printing, a negative film automatic feed and stop mechanism and a negative film mark forming mechanism for determining the stop position of effective frames upon recording and to be used upon printing;
frame visual inspection means including a display mechanism and a negative film manual feed mechanism;
manual input means of exposure light correcting value relating to color failure and abnormal light negatives;
calculating means for density exposure light correcting value concerning density failure and a density measuring means therefor, including an optical system for forming a light to be transmitted through the negative film, a density measuring mechanism of the negative film and a correcting value arithmetic unit;
an information recording means consisting of a write-in mechanism, a recording mechanism and a recording medium; and a reader control means for successively operating said respective units and means, which is constituted by logic circuitry so as to place respective portions in operating condition only when said automatic feed mechanism is set to operating state, operate said automatic stop mechanism every time said frame position detection mechanism detects each frame, operate said negative film mark forming mechanism when said automatic stop mechanism is actuated and the negative film is stopped, calculate density exposure light correcting value by driving said arithmetic means and said density measuring means therefor, record color exposure light correcting value from said manual input means and density exposure light correcting value into said information recording means, and interrupt automatic feed function as well as automatic write-in function of color exposure light correcting value and density exposure light correcting value into said recording means when said automatic feed mechanism is released;

while said printer comprises:

automatic printer constituents including a negative film setting mechanism, a printing paper feed mechanism, an optical system for printing, a density measuring unit and an exposure light control mechanism;

a detection and stop means for designated effective frames, including a mark detection mechanism and a negative film feed and stop mechanism;

an exposure light intrinsic value correction means including a readout mechanism from said recording medium and an arithmetic unit of compensating the exposure light intrinsic value with exposure light correcting value; and a printer control means for successively operating said respective constituents and means, which is constituted by logic circuitry so as to operate said negative film stop mechanism when said mark detection mechanism is actuated, and operate said readout mechanism and said arithmetic unit when said negative film stop mechanism is actuated.

* * * * *